Jan. 22, 1935.  E. J. CARDARELLI  1,988,481
PREPARATION OF KETONES
Filed Sept. 11, 1931
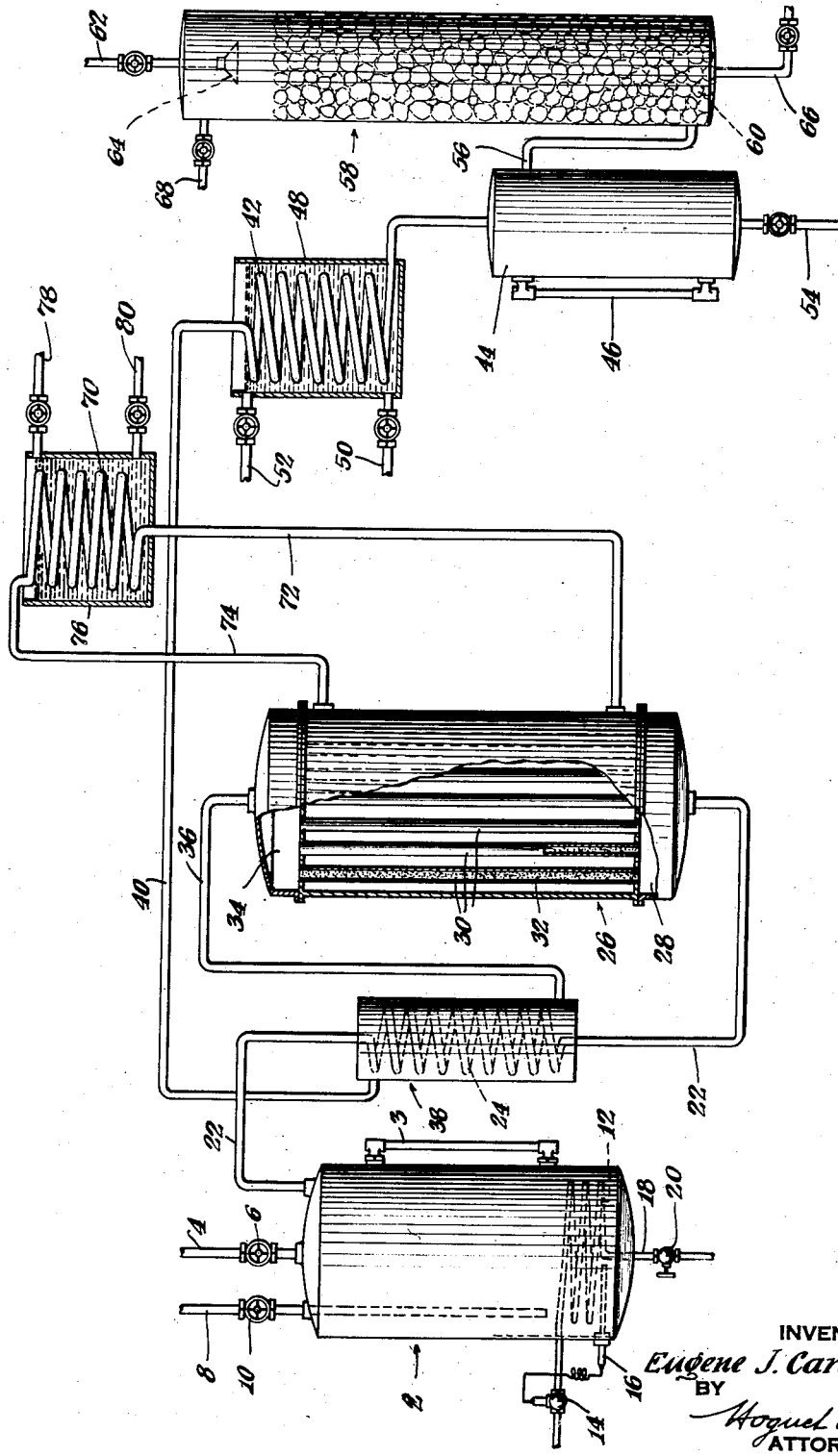
INVENTOR
Eugene J. Cardarelli
BY
Hoguet & Meary
ATTORNEYS Patented Jan. 22, 1935

1,988,481

UNITED STATES PATENT OFFICE 1,988,481

PREPARATION OF KETONES

Eugene J. Cardarelli, Newark, N. J., assignor, by mesne assignments, to Standard Alcohol Company, Wilmington, Del., a corporation of Delaware Application September 11, 1931, Serial No. 562,268

6 Claims. (Cl. 260—134)

My present invention relates to the preparation of ketones by the oxidation of secondary alcohols and more particularly to the oxidation of such alcohols by air in the presence of suitable catalytic materials.

For many years chemists have recognized that when certain secondary alcohols are passed over copper at sufficiently high temperatures, ketones are formed with the liberation of hydrogen. In carrying out this reaction, air is generally passed over the catalysts with the alcohol vapors, whereupon such reaction becomes strongly exothermic, due to the production of water by the combination of hydrogen with oxygen. When the proportion of oxygen in the air closely approaches the theoretical amount necessary to oxidize the alcohol to ketone, the reaction is so strongly exothermic as to generally raise the temperature in the oxidation zone to 800° F. or higher. Such high temperatures cause undesirable decomposition reactions to proceed, which decrease the yield and greatly complicate the process and increase the expense of purifying the ketones.

It has been proposed to use a large excess of air admixed with the alcohol vapors in order to reduce this high temperature and the decomposition reactions taking place. However, such expedient has not proved to be entirely successful and, furthermore, is objectionable in that the additional quantity of oxygen provided causes the oxidation to proceed beyond the point desired forming a mixture of undesirable products such as carbon dioxide, aldehydes, organic acids, etc.

One of the primary objects of my invention is to provide an improved method for forming ketones from secondary alcohols, which method does not have the various objectionable features of the prior known methods.

My invention is based upon my discovery that much higher yields of ketones are obtainable in a much purer condition if the temperature of the substances undergoing reaction and the products thereof are maintained by means of suitable cooling devices to below 350° C. When such temperatures are maintained mixtures of oxygen and alcohol vapors in substantially theoretical proportions may be employed.

In order that the characteristics of my invention and the preferred mode in which I contemplate carrying the same into effect may be readily understood by those skilled in the art, the same will be hereinafter described in more detail in conjunction with the accompanying drawing which illustrates one type of apparatus which may be employed in carrying my invention into effect.

In general terms, my new method comprises mixing vapors of secondary alcohols with air in such amounts that the oxygen in the air and the alcohol vapors are present in substantially theoretical proportions. The mixture of air and alcohol vapors is then raised to a suitable temperature, appreciably below that desired in the reaction zone and yet sufficiently to materially assist the reaction to take place rapidly and efficiently. The heated mixed vapors are then passed through a reaction zone where they come into contact with a suitable catalyst, the catalyst and the mixture of air and vapors being cooled by any suitable means to maintain the temperature below 350° C. and preferably between 290 and 310° C. The reaction products are then passed in heat exchanging relationship to the mixture of alcohol and air before it enters the reaction zone in order to produce the preheating heretofore referred to.

In order to efficiently maintain and closely control the temperature within the reaction zone, the catalysts are preferably contained in tubes of small diameter or in flattened tubes or between sheets of heat-conducting material placed closely together so that there is at all times but a small distance between any point in the catalytic mass and the surfaces of the containers. The preferred distance between the opposed surfaces of the container measured through the catalytic material is about one-half inch or less. However, this distance between the surfaces of the container may be varied, depending generally upon the conductivity of the catalytic mass and the material supporting the same when such supporting material is used. The walls of the container for the catalysts are preferably cooled by means of a suitable fluid.

One form of apparatus which may be used for carrying out the method of my invention is disclosed in the drawing in which a suitable mixing tank 2 is provided with a sight glass 3 and a conduit 4 having a control valve 6 for admitting alcohol to the container and maintaining it at a predetermined and constant level. A suitable conduit 8 provided with a control valve 10 extends downwardly to adjacent the bottom of the mixing tank 2 and is provided for admitting air to be bubbled through the alcohol in the tank. A heating coil 12 is positioned adjacent the bottom of the tank 2 and is provided with a suitable control valve 14 automatically controlled through electrical connection with a thermostat 16. The heating coil 12 is also provided with an outlet 18 controlled by valve 20. A conduit 22 connected with the top of the tank 2 is formed with a coil portion 24 intermediate its ends. The other end of the conduit 22 is connected with a header 28 of the reaction vessel 26, which is in the form of an ordinary fire tube boiler. The tubes 30 of the vessel 26 are of small diameter and loosely filled with a catalytic material 32 spread over the surfaces of and supported by any suitable inert material. A header 34 of the reaction vessel 26 is connected with a conduit 36 which leads into a suitable jacket 38 enclosing the coil 24 of the conduit 22. A conduit 40 connected with the top of the jacket 38 has a coil portion 42 operating as a condenser and is connected to a suitable settling tank 44 provided with a sight glass 46. The coil 42 of the conduit 40 is enclosed by tank 48 provided with valved conduits 50 and 52. The settling tank 44 is provided with a valve controlled conduit 54 for drawing off liquid material settled therein. A conduit 56 leads from adjacent top of the settling vessel 44 to adjacent the bottom of a scrubbing tower 58. The tower 58 is substantially filled with an inert filling material 60, such as stoneware rings, cracked stone, or other equivalent material providing large surfaces for the contact of gas and liquid. A valved conduit 62 provided with a rose or other suitable spraying device 64 enters the top of the scrubbing tower 58. A valved conduit 66 is connected with the bottom of the scrubber 58 for drawing off liquid therefrom. A valved conduit 68 is provided adjacent the top of the scrubber for permitting the scrubbed gases to be passed off into the atmosphere. A condensing coil 70 connected by conduits 72 and 74 to the space surrounding the tubes 30 is enclosed by a tank 76 provided with valved conduits 78 and 80.

In the practice of my invention using the above described apparatus the operation is as follows: A suitable secondary alcohol is pumped into the tank 2 through the conduit 4 and valve 6 to fill the tank to the desired level. The valve 6 is then so regulated as to maintain the alcohol in the tank at a substantially constant level. Atmospheric air is forced through conduit 8 and valve 10 to cause it to bubble upwardly through the alcohol in the tank 2 at a predetermined rate. Steam or other heating fluid is passed through the coil 12 to heat the alcohol in the tank to a temperature where the vapor pressure of the alcohol will be such as to cause the air to entrain and carry off alcohol vapors in an amount such that the proportions of oxygen and alcohol vapors carried thereby will be substantially theoretical. The flow of heating fluid through the coil 12 is automatically controlled by a valve 14 through the thermostatic control device 16 to maintain the alcohol in the tank at the desired temperature.

The mixture of alcohol vapors and air passes off from the tank through the conduit 22 and the heat-exchanging device 24—38 to the header 28 of the reaction vessel 26. The mixture of alcohol vapors and air then flows upwardly through the tubes 30 and the catalytic material 32, whereupon the alcohol is oxidized to ketone. The products of the reaction flow into the header 34 and through the conduit 36 to the jacket 38. On passing through the jacket 38 the products of the reaction contact with the coil 24, preheating the mixture of alcohol vapors and air before they enter the header 28. These reaction products, after passing through the heat-exchanging device, pass through the conduit 40 and the coil 42, wherein they are substantially completely condensed. This condensation in the coil 42 is affected by passing cooling fluid into tank 48 by means of conduit 50 and outwardly therefrom by means of conduit 52. The mixture of condensed reaction products and gases pass from the coil 42 into the settling tank 44, wherein the condensed liquid settles to the bottom and is drawn off through conduit 54. The gases and other uncondensed materials pass off from the settling tank through conduit 56 into the scrubber 58 wherein they are washed by water or other absorbent fluid forced into the scrubber through conduit 62 and the spraying device 64. The absorbent material entering the scrubber flows down over the inert filling material intimately contacting with the gaseous material flowing into the scrubber from conduit 56 and absorbs any uncondensed valuable constituents in the gaseous mixture passing from the settler 44. The absorbent material, with the constituents absorbed thereby, is drawn off through conduit 66 to any suitable device for separating the absorbed constituents therefrom. The scrubbed gases pass off from the top of the scrubbing tower through conduit 68 to the atmosphere or to any other suitable treating device.

The tubes 30 in the reaction vessel 26 are surrounded by any suitable cooling fluid for maintaining the temperature within the tubes substantially constant. This cooling fluid circulates through the conduits 72, 74, and the coil 70, and is in turn cooled, while passing through the coil 70, by means of any suitable cooling fluid admitted to the tank 76 through conduit 80 and passing off through conduit 78. The cooling fluid surrounding the tubes 30 may be any fluid which may be heated up to 350° without decomposition. However, I prefer to use an organic substance which has a boiling point at about the temperature which it is desired to maintain within the reaction zone. Some of the substances which are suitable for this purpose are di-phenyl boiling at 254° C., di-phenyl methane boiling at 262° C., di-phenyl oxide boiling at 257° C., beta-naphthol boiling at 288° C., alpha or beta naphthylamine boiling at 300° C., and 294° C., respectively. Any other material which will boil within the general range of 225° to 325° C., which is not appreciably decomposed at these temperatures, and which does not attack the material of the apparatus, may be employed. The condensing apparatus 70, 76, 78 and 80 is provided for condensing and cooling such cooling fluid and the fluid used for condensing such vapors may be any suitable material such as water or oil, which will cool and condense such vapors without cooling them to a point where they will solidify.

The catalytic material in the tubes 30 may be any suitable material such as copper or brass, and the tubes containing such catalytic material may be composed of the same or of different material. The catalytic material is preferably in finely divided form supported on inert material such as quartz in the form of small pebbles, or pumice stone in small lumps. Such silicious materials are preferable to clay, kaolin, or aluminum, as they do not have a tendency to decompose the alcohol to unsaturated hydrocarbons. The walls of the tubes themselves, particularly when made of copper or brass, may serve as the sole catalytic agent, but in such case the tubes must be made of appreciably greater length than when filled with catalytic material.

The temperature of the alcohol in the tank 2 is controlled in accordance with the rate of the flow of air passing therethrough and depends to some extent upon the particular alcohol being treated. For instance, when air is being passed through the alcohol and the alcohol in the tank 2 constitutes isopropyl alcohol, the temperature of the alcohol is preferably maintained at approximately 60° C. Under the same circumstances secondary butyl alcohol is preferably maintained at a temperature of approximately 80° C. and secondary amyl alcohols are preferably maintained at a temperature of approximately 96° C.

By causing the products of reaction to pass in a heat-exchanging relation to the mixture of alcohol vapors and air before entering the reaction vessel, valuable advantages in efficiency and speed of operation are obtained without the assistance of outside heat. By preheating the mixed gases, they more quickly attain the most efficient reaction temperature in the reaction vessel and thereby permit the process to proceed more rapidly. For example, when the mixed gases entering the heat-exchanged are at the temperature of about 80° C., the heat supplied from the products of reaction is sufficient to raise the temperature of the mixture of air and alcohol vapors to a temperature of approximately 160° C.

Instead of a scrubber, such as 58, using an absorbent liquid, two or more scrubbers containing solid absorbent material, such as porous carbon or silica gel, may be used. When such scrubbers are used, they are preferably provided with means for heating and expelling absorbed material without the removal of the solid absorption material. Since such scrubbers, using solid absorbent material, and their use and operation are well known, I do not consider it to be necessary to show specific constructions thereof in the drawing.

While I have described in some detail specific apparatus and a specific method of practising my invention, it is to be understood that such description is merely by way of illustration and that changes may be made in the various parts of the apparatus described, that other and different apparatus may be substituted therefor, and that various steps of my process as described may be modified in many ways and some of the steps omitted without departing from my invention. Accordingly, the scope of my invention is to be limited solely by the following claims and the prior art.

I claim:

1. The method of oxidizing secondary alcohols to ketones, which comprises passing a mixture of gases containing substantially theoretical proportions of alcohol vapors and oxygen for conversion to ketones through a reaction zone where a temperature between 225° C. and 350° C. is maintained, and passing a cooling fluid in heat exchanging relation to the reaction zone and the contents thereof, said cooling fluid boiling at a temperature between 250° and 350° C., whereby the temperature in the reaction zone is positively maintained below 350° C.

2. The method of oxidizing secondary alcohols to ketones which comprises passing a mixture of alcohol vapors and oxygen in a continuous stream through a heat exchanger wherein the mixture is preheated, then passing the mixture in a continuous stream through a reaction zone wherein the temperature of the mixture is raised further due to an exothermic reaction taking place therein, passing a cooling fluid having a boiling point between 225° and 325° C. in heat exchanging relation to the reaction zone and the contents thereof to positively maintain the temperature of said zone and contents between 250° and 350° C. and passing the reaction products through the heat exchanger in heat exchanging relation to the stream of mixed alcohol vapors and oxygen for preheating such mixture, then condensing and scrubbing the reaction products to remove valuable products therefrom.

3. The method of oxidizing secondary alcohols to ketones, which comprises passing a mixture of alcohol vapors and oxygen through a heat exchanger wherein the mixture is preheated, then passing the preheated mixture through a zone subdivided into relatively small units in the presence of a copper catalyst wherein the temperature of the mixture is raised further due to the exothermic reaction taking place therein, maintaining a cooling fluid in heat exchange relationship with said plurality of unit reaction zones whereby the heat of said exothermic reaction is absorbed by said cooling fluid, said cooling fluid having a boiling point between 225 and 325° C., vaporizing a portion of said cooling fluid by said absorbed heat, condensing the vaporized cooling fluid and returning the same, whereby the temperature in the reaction zone is positively maintained between 225° and 350° C., and condensing the ketones discharged from the reaction zone.

4. In an exothermic process for converting secondary alcohols to ketones, the method which comprises cooling the reaction zone with a liquid having a boiling point above about 225° C. but not higher than the maximum temperature desired in the reaction zone.

5. In the process of oxidizing secondary alcohols to ketones by passing a gaseous mixture containing alcohol vapors and oxygen through a hot reaction zone, the method of preventing the temperature of the reactants and conversion products from rising above a certain desired maximum limit, which comprises effecting the reaction in a reaction zone subdivided into a plurality of units adapted to be cooled efficiently by heat exchange with a cooling fluid and maintaining in heat exchange relation with said reaction zone units a cooling fluid having a boiling point above about 225° C. but not higher than said desired maximum temperature limit.

6. The process for preparing ketones, which comprises passing a gaseous mixture containing vapors of secondary alcohols and oxygen through a catalytic reaction zone and preventing overheating and excessive oxidation of the reactants and conversion products by cooling the reaction zone with a liquid having a boiling point above about 225° C. but not higher than 325° C., selected from the group consisting of diphenyl, diphenyl methane, diphenyl oxide, beta-naphthol, alpha-naphthylamine, and beta-naphthylamine.

EUGENE J. CARDARELLI.